United States Patent
Liu et al.

(10) Patent No.: US 8,634,196 B2
(45) Date of Patent: Jan. 21, 2014

(54) LOCKING MECHANISM AND ELECTRONIC DEVICE

(75) Inventors: Chen-Kuang Liu, Taoyuan (TW); Yu-Min Chen, Taoyuan (TW)

(73) Assignee: HTC Corporation, Taoyuan County (TW)

( * ) Notice: Subject to any disclaimer, the term of this patent is extended or adjusted under 35 U.S.C. 154(b) by 258 days.

(21) Appl. No.: 12/687,888

(22) Filed: Jan. 15, 2010

(65) Prior Publication Data

US 2011/0038105 A1 Feb. 17, 2011

(30) Foreign Application Priority Data

Aug. 14, 2009 (TW) ................................ 98127501 A

(51) Int. Cl.
*H05K 7/16* (2006.01)

(52) U.S. Cl.
USPC ...... 361/727; 361/679.57; 16/363; 455/575.4

(58) Field of Classification Search
USPC ............ 361/679.01, 679.02, 679.55, 679.57, 361/679.26, 679.27, 724–727; 455/575.1–575.4; 341/22–33; 345/168–172; 400/472–496; 16/363; 24/303

See application file for complete search history.

(56) References Cited

U.S. PATENT DOCUMENTS

| 7,539,011 | B2 * | 5/2009 | Shih et al. ................. 361/679.26 |
| 8,265,719 | B2 * | 9/2012 | Lindvall ..................... 455/575.4 |
| 2007/0153465 | A1 | 7/2007 | Shih et al. |
| 2007/0252202 | A1 | 11/2007 | Park et al. |
| 2008/0081505 | A1 | 4/2008 | Ou et al. |
| 2008/0274776 | A1 * | 11/2008 | Cho et al. ................... 455/575.4 |

FOREIGN PATENT DOCUMENTS

WO 2008013739 1/2008

OTHER PUBLICATIONS

"Search Report of European Counterpart Application" issued on Mar. 1, 2010, p. 1-p. 3.
"Office Action of European Counterpart Application" issued on Mar. 25, 2010, p. 1-p. 4.

* cited by examiner

*Primary Examiner* — Jinhee Lee
*Assistant Examiner* — Ingrid Wright
(74) *Attorney, Agent, or Firm* — Jianq Chyun IP Office

(57) ABSTRACT

A locking mechanism and an electronic device are provided. The electronic device includes a first body, a second body, a moving module, and a locking mechanism. The moving module is disposed between the first body and the second body, so that the second body is rotatable and tiltable relative to the first body. The locking mechanism includes a first connecting member and a plug. When the plug is coupled with the first connecting member by a magnetic force, the second body is slidable relative to the first body. When the second body is tilted up to decouple the plug from the first connecting member, the plug interferes the moving module, so that the second body is not slidable relative to the first body.

15 Claims, 5 Drawing Sheets

LOCKING MECHANISM AND ELECTRONIC DEVICE

CROSS-REFERENCE TO RELATED APPLICATION

This application claims the priority benefit of Taiwan application serial no. 98127501, filed on Aug. 14, 2009. The entirety of the above-mentioned patent application is hereby incorporated by reference herein and made a part of specification.

BACKGROUND OF THE INVENTION

1. Field of the Invention

The present application relates to a locking mechanism and an electronic device. More particularly, the present application relates to a locking mechanism and an electronic device having a switching plug.

2. Description of Related Art

Along with development of technology, people increasingly depend on electronic devices. As the electronic devices are required to have features of high performance and lightness, slimness, shortness and smallness in size, various electronic devices such as ultra mobile personal computers (UMPCs), tablet PCs, pocket PCs, personal digital assistants (PDAs), cell phones and notebook PCs are produced accordingly.

To improve an input convenience, a handheld electronic device may have a QWERTY-type keyboard on its body, though if the keyboard and a display screen are located at a same side of the body, the body is required to have a relatively great size to contain the keyboard and the display screen. Therefore, two-layer folding bodies or two-layer sliding bodies are produced.

Taking the two-layer sliding bodies as an example, a sliding mechanism and a rotating mechanism are configured between the display screen and the keyboard. When a user slides the display screen to a side of the keyboard through the sliding mechanism, the display screen can be tilted relatively to the keyboard through the rotating mechanism, so as to expose the keyboard and erect the display screen on the keyboard to facilitate the user viewing and inputting.

However, after the display screen is tilted, the display screen is probably slid relatively to the keyboard, which may cause a collision of the bodies and cause damage.

SUMMARY OF THE INVENTION

The present application is directed to a locking mechanism, which is used to confine sliding and tilting between bodies of an electronic device.

The present application is directed to an electronic device, in which bodies thereof have a stable motion to prevent a collision therebetween.

The present application provides a locking mechanism configured in an electronic device. The electronic device includes a first body, a second body, and a moving module. The moving module is disposed between the first body and the second body, so that the second body is slidable and tiltable relative to the first body. The locking mechanism includes a first connecting member and a plug. The first connecting member is disposed on the first body. The plug is movably disposed on the moving module. When the plug is coupled with the first connecting member by a magnetic force, the second body is slidable relative to the first body. When the second body is tilted up to decouple the plug from the first connecting member, the plug interferes the moving module, so that the second body is not slidable relative to the first body.

The present invention provides an electronic device including a first body, a second body, a moving module and a locking mechanism. The moving module is disposed between the first body and the second body, so that the second body is slidable and tiltable relative to the first body. The locking mechanism includes a first connecting member and a plug. The first connecting member is disposed on the first body. The plug is movably disposed on the moving module. When the plug is coupled with the first connecting member by a magnetic force, the second body is slidable relative to the first body. When the second body is tilted up to decouple the plug from the first connecting member, the plug interferes the moving module, so that the second body is not slidable relative to the first body.

According to the above descriptions, in the electronic device of the present application, motions of the bodies can be clearly confined through the locking mechanism, namely, after the second body is tilted, the second body is not slidable relative to the first body. In other words, after the second body is tilted, collision between the second body and the first body can be avoided, so as to avoid damage.

In order to make the aforementioned and other features and advantages of the present invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
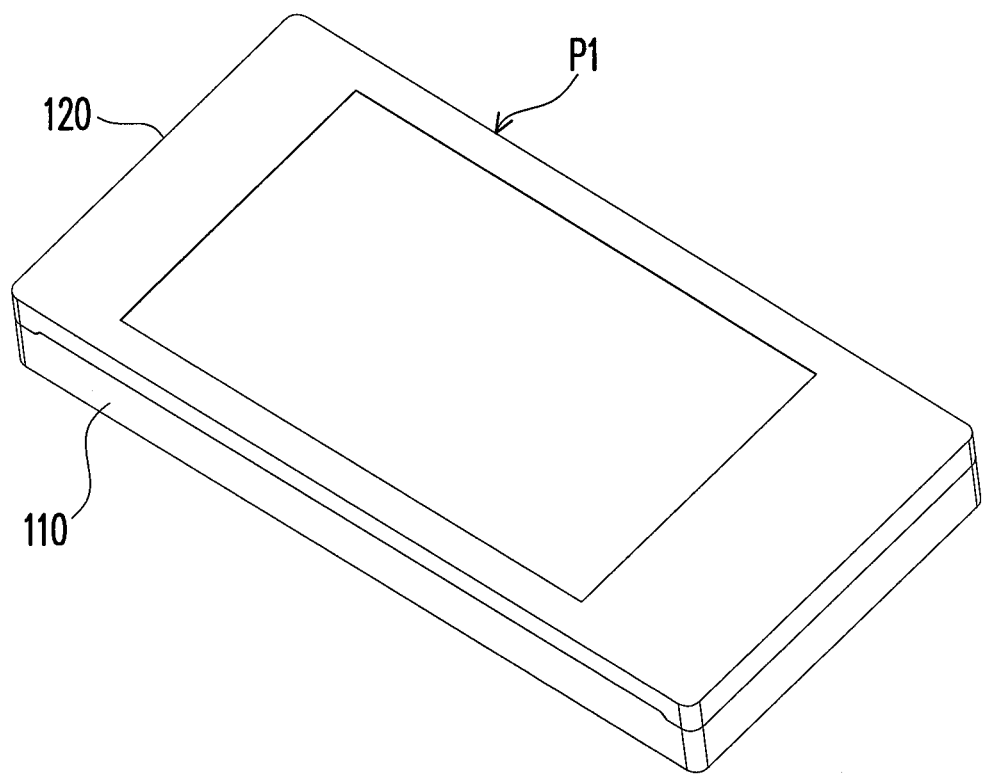
FIG. 1 is a schematic diagram illustrating an electronic device according to an embodiment of the present invention.
Figure 2:
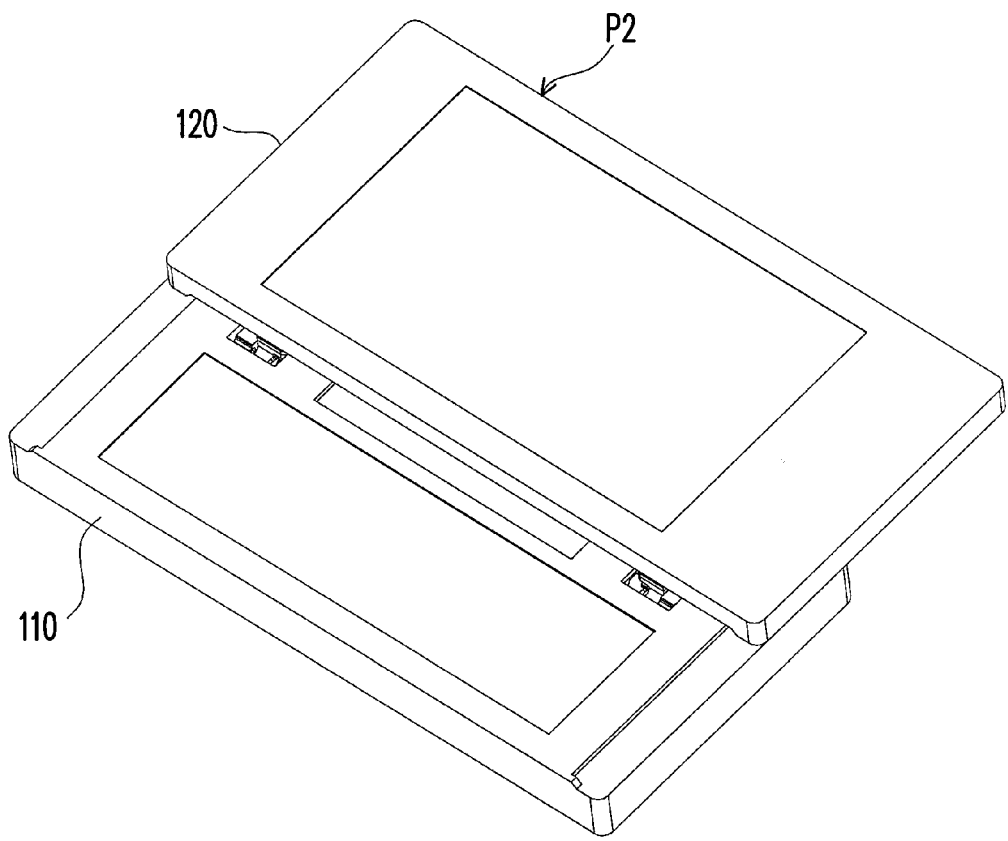
FIG. 2 is a schematic diagram illustrating a situation that a second body is slid relatively to a first body in an electronic device of FIG. 1.
Figure 3:
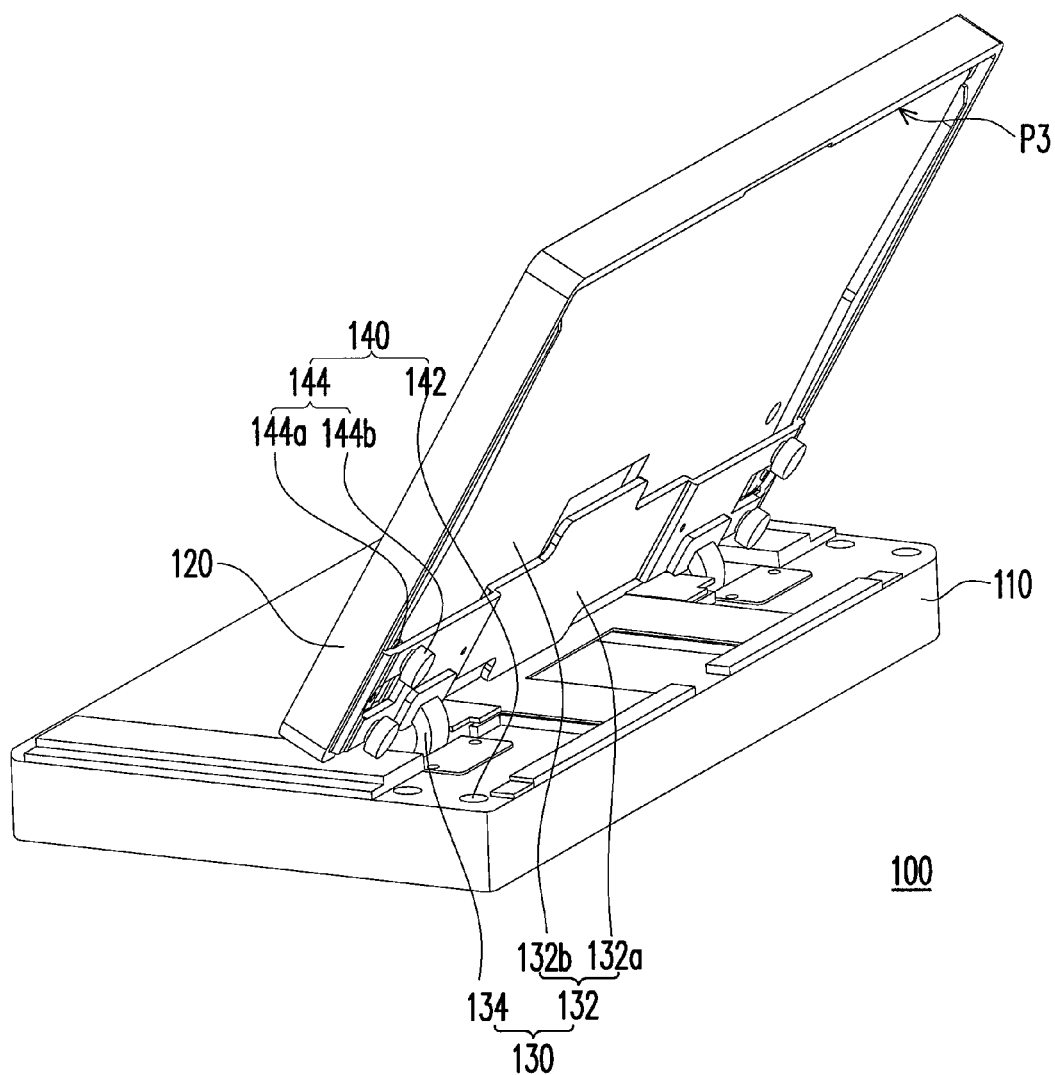
FIG. 3 is a schematic diagram illustrating a situation that a second body is tilted relatively to a first body in an electronic device of FIG. 1.

FIG. 1 is a schematic diagram illustrating an electronic device according to an embodiment of the present invention. FIG. 2 is a schematic diagram illustrating a situation that a second body is slid relatively to a first body in the electronic device of FIG. 1. FIG. 3 is a schematic diagram illustrating a situation that the second body is tilted relatively to the first body in the electronic device of FIG. 1. Referring to FIG. 1, FIG. 2 and FIG. 3, the electronic device 100 includes a first body 110, a second body 120, a moving module 130 and a locking mechanism 140. The moving module 130 is disposed between the first body 110 and the second body 120, so that the second body 120 is slidable and tiltable relative to the first body 110.

Referring to FIG. 3, the locking mechanism 140 includes a first connecting member 142 and a plug 144. The first connecting member 142 is disposed on the first body 110. The plug 144 is movably disposed on the moving module 130. When the plug 144 is coupled with the first connecting member 142 by a magnetic force, the second body 120 is slidable relative to the first body 110. Moreover, when the second body 120 is tilted up to decouple the plug 144 from the first connecting member 142, the plug 144 interferes the moving module 130, so that the second body 120 is not slidable relative to the first body 110.

Accordingly, in the electronic device 100 of the present embodiment, when the second body 120 is tilted relatively to the first body 110, the plug 144 is decoupled from the first connecting member 142, and now the plug 144 interferes the moving module 130, so that the second body 120 cannot be slid relatively to the first body 110, and therefore collision and damage caused by relative sliding of the second body 120 can be avoided.

In detail, in the present embodiment, the plug 144 has a rod 144a and a second connecting member 144b. The second connecting member 144b is located at a first end of the rod 144a and corresponds to the first connecting member 142, and the second connecting member 144b is adapted to be coupled to the first connecting member 142 by a magnetic force.

In the present embodiment, the second connecting member 144b and the first connecting member 142 are magnets, and magnetic polarities of the second connecting member 144b and the first connecting member 142 are reversed, so that the plug 144 can be attracted to the first connecting member 142. Here, implementations of the first connecting member 142 and the second connecting member 144b are not limited, and in another embodiment that is not illustrated, one of the first connecting member and the second connecting member is a magnet or an electromagnet, and the other is a magnetic material, a permanent magnet or an electromagnet, wherein the magnetic material is, for example, iron, cobalt or nickel, by which the same effect of the aforementioned embodiment can also be achieved. In another embodiment, the rod 144a and the second connecting member 144b can be formed by a same material. For example, one of the first connecting member 142 and the plug 144 is a permanent magnet or an electromagnet, and the other is a magnetic material, a permanent magnet or an electromagnet, which can also achieve the same effect of the aforementioned embodiment.

When the second connecting member 144b of the plug 144 is attracted to the first connecting member 142 by the magnetic force, the second body 120 is slidable relative to the first body 110. When the second connecting member 144b is decoupled from the first connecting member 142, the plug 144 interferes the moving module 130, so that the second body 120 is not slidable relative to the first body 110.

Referring to FIG. 1 to FIG. 3 again, the moving module 130 includes a sliding module 132 and a rotating module 134. The sliding module 132 is coupled to the second body 120, so that the second body 120 can be slid relatively to the first body 110 between a first position P1 of FIG. 1 and a second position P2 of FIG. 2 through the sliding module 132. The rotating module 134 is coupled between the first body 110 and the sliding module 132, so that the second body 120 can be rotated relatively to the first body 110 between the second position P2 of FIG. 2 and a third position P3 of FIG. 3. Though, structures and action methods of the sliding module 132 and the rotating module 134 are not limited by the present invention.

Figure 4:
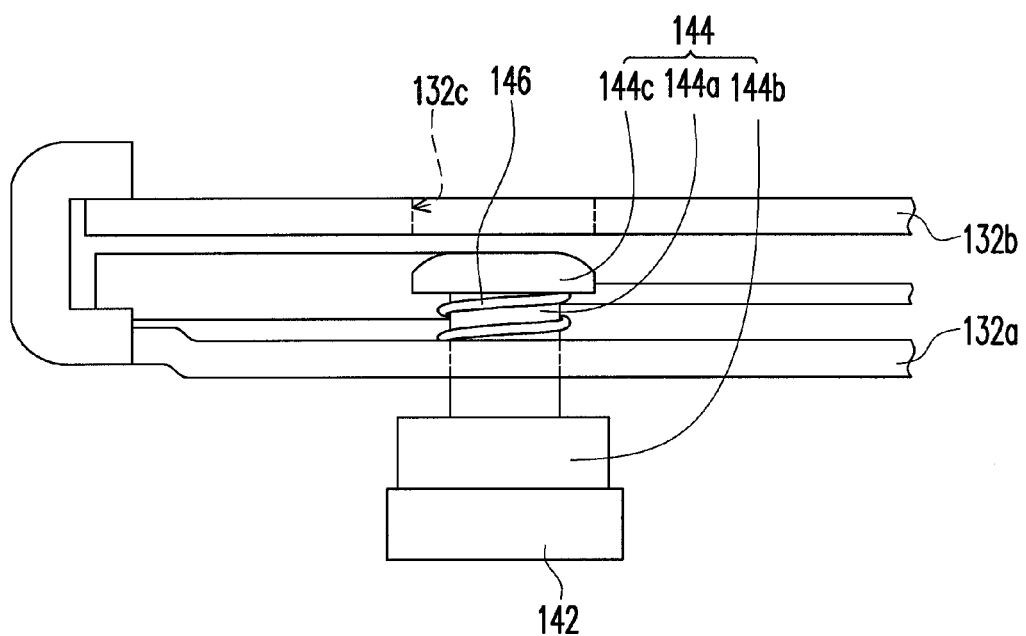
FIG. 4 is a partial schematic diagram illustrating a locking mechanism of an electronic device of FIG. 2.
Figure 5:
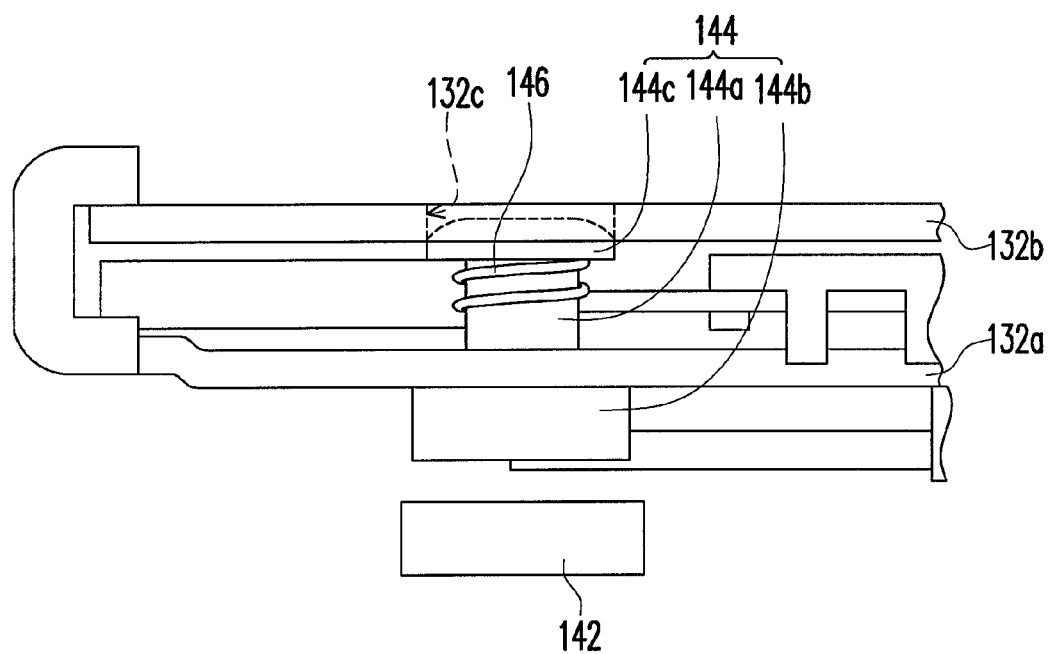
FIG. 5 is a partial schematic diagram illustrating a locking mechanism of an electronic device of FIG. 3.

FIG. 4 is a partial schematic diagram illustrating the locking mechanism of the electronic device of FIG. 2. FIG. 5 is a partial schematic diagram illustrating the locking mechanism of the electronic device of FIG. 3. Here, a state that the plug 144 is attracted to the first connecting member 142 is described according to FIG. 4, and a state that the plug 144 is decoupled from the first connecting member 142 is described according to FIG. 5, wherein the first body 110 and the second body 120 are not illustrated, so as to clearly recognize the locking mechanism 140.

Referring to FIG. 2, FIG. 3 and FIG. 4, in the present embodiment, the sliding module 132 includes a first plate 132a and a second plate 132b. The first plate 132a is connected to the rotating module 134, and the second plate 132b is fixed to the second body 120. The first plate 132a is slidingly coupled to the second plate 132b. The rod 144a is movably disposed on the first plate 132a, and the second connecting member 144b is located between the first plate 132a and the first body 110. When the second body 120 is located at the second position P2 of FIG. 2, since the magnetic polarities of the second connecting member 144b and the first connecting member 142 are reversed, the plug 144 can be attracted to the first connecting member 142, so that the second body 120 is slidable relative to the first body 110.

Moreover, referring to FIG. 4 and FIG. 5, the second plate 132b has a positioning hole 132c, and the plug 144 further has a support portion 144c located at another end of the rod 144a. Moreover, the locking mechanism 140 further includes an elastic member 146 contacted between the support portion 144c and the first plate 132a.

When the second body 120 is slid relatively to the first body 110 between the first position P1 of FIG. 1 and the second position P2 of FIG. 2, the second connecting member 144b is attracted to the first connecting member 142, and the support portion 144c compresses the elastic member 146. When the second body 120 is located at the second position P2 of FIG. 2, the user can exert a force on the second body 120 to tilt the second body 120 relatively to the first body 110. By such means, the second body 120 drives the plug 144 to decouple from the first connecting member 142, and the elastic member 146 drives the support portion 144c by its elastic restoring force, so that the rod 144a enters the positioning hole 132c. By such means, the second plate 132b and the first plate 132a are fixed by the plug 144, so that the second body 120 is not slidable relative to the first body 110.

In another embodiment, the rotating module 134 can include a torque shaft. When the second body 120 is slid out (shown as FIG. 2), the second body 120 can be automatically tilted. In this case, a space between the first body 110 and the second body 120 in an overlapping state (shown as FIG. 1) is probably inconsistent, though the locking mechanism 140 can control the space between the first body 110 and the second body 120 in the overlapping state (shown as FIG. 1).

In summary, based on coordination of the plug and the first connecting member, when the second body is tilted, the plug can confine sliding of the second body, so as to avoid a collision and damage of the two bodies. Moreover, since the first connecting member is disposed in the body, regardless of the body of the electronic device being slid or tilted, the electronic device may have a concise appearance.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A locking mechanism, configured in an electronic device, the electronic device comprising a first body, a second body and a moving module, wherein the moving module is disposed between the first body and the second body, so that the second body is slidable and tiltable relative to the first body, the moving module includes a rotating module, a first plate, and a second plate having a positioning hole, the rotating module is configured on the first body, the first plate is connected to the rotating module, the second plate is fixed to the second body, and the first plate is slidingly coupled to the second plate with opposite edges where the positioning hole is disposed therebetween, the locking mechanism comprising:

a first connecting member, disposed on the first body; and
a plug, movably disposed on the first plate,
wherein when the plug is coupled with the first connecting member by a magnetic force, the second body is slidable relative to the first body, and when the second body is tilted up relative to the first body, the first plate and the second plate are tilted up and away from the first body with the second body, such that a first end of the plug is decoupled from the first connecting member, a second end of the plug enters and interferes the positioning hole, and the first plate and the second plate are constrained by the plug to avoid sliding relative to each other,
wherein when the second body is not tilted up relative to the first body, the first end of the plug is coupled with the first connecting member by a magnetic force, the second end of the plug is not interfered with the positioning hole, such that the first plate and the second plate are not constrained by the plug and slide relative to each other.

2. The locking mechanism as claimed in claim 1, wherein the moving module has a positioning hole, and when the plug is decoupled from the first connecting member, a second end of the plug enters the positioning hole.

3. The locking mechanism as claimed in claim 2, further comprising an elastic member, and the plug has a support portion located at the second end, the elastic member is contacted between the support portion and the moving module, when the plug is coupled to the first connecting member, the support portion compresses the elastic member, and when the plug is decoupled from the first connecting member, the elastic member drives the support portion, so that the second end of the plug enters the positioning hole.

4. The locking mechanism as claimed in claim 1, wherein one of the first connecting member and the plug is a permanent magnet or an electromagnet, and the other is a magnetic material, a permanent magnet or an electromagnet.

5. The locking mechanism as claimed in claim 1, wherein the plug comprises a rod and a second connecting member, the second connecting member is located at a first end of the rod and corresponds to the first connecting member, and the second connecting member is adapted to be coupled to the first connecting member by a magnetic force.

6. The locking mechanism as claimed in claim 5, wherein one of the first connecting member and the second connecting member is a magnet or an electromagnet, and the other is a magnetic material, a permanent magnet or an electromagnet.

7. An electronic device, comprising:
a first body;
a second body;
a moving module, disposed between the first body and the second body, so that the second body is slidable and tiltable relative to the first body, the moving module includes a rotating module, a first plate, and a second plate having a positioning hole, the rotating module is configured on the first body, the first plate is connected to the rotating module, the second plate is fixed to the second body, and the first plate is slidingly coupled to the second plate with opposite edges where the positioning hole is disposed therebetween;
a locking mechanism, comprising:
a first connecting member, disposed on the first body; and
a plug, movably disposed on the first plate,
wherein when the plug is coupled with the first connecting member by a magnetic force, the second body is slidable relative to the first body, and when the second body is tilted up relative to the first body, the first plate and the second plate are tilted up and away from the first body with the second body, such that a first end of the plug is decoupled from the first connecting member, a second end of the plug enters and interferes the positioning hole, and the first plate and the second plate are constrained by the plug to avoid sliding relative to each other,
wherein when the second body is not tilted up relative to the first body, the first end of the plug is coupled with the first connecting member by a magnetic force, the second end of the plug is not interfered with the positioning hole, such that the first plate and the second plate are not constrained by the plug and slide relative to each other.

8. The electronic device as claimed in claim 7, wherein the moving module has a positioning hole, and when the plug is decoupled from the first connecting member, a second end of the plug enters the positioning hole.

9. The electronic device as claimed in claim 8, wherein the locking mechanism further comprises an elastic member, and the plug has a support portion located at the second end, the elastic member is contacted between the support portion and the moving module, when the plug is coupled to the first connecting member, the support portion compresses the elastic member, and when the plug is decoupled from the first connecting member, the elastic member drives the support portion, so that the second end of the plug enters the positioning hole.

10. The electronic device as claimed in claim 7, wherein the moving module comprises:
a sliding module, coupled to the second body; and
the rotating module, coupled between the first body and the sliding module.

11. The electronic device as claimed in claim 10, wherein the sliding module comprises the first plate and the second plate, the first plate is connected to the rotating module, and the second plate is fixed to the second body, the first plate is slidingly coupled to the second plate, and the plug is movably disposed on the first plate.

12. The electronic device as claimed in claim 10, wherein the rotating module comprises a torque shaft, so that the second body is capable of being automatically tilted.

13. The electronic device as claimed in claim 7, wherein one of the first connecting member and the plug is a magnet or an electromagnet, and the other is a magnetic material, a permanent magnet or an electromagnet.

14. The electronic device as claimed in claim 7, wherein the plug comprises a rod and a second connecting member, the second connecting member is located at a first end of the rod and corresponds to the first connecting member, and the second connecting member is adapted to be coupled to the first connecting member by a magnetic force.

15. The electronic device as claimed in claim 14, wherein one of the first connecting member and the second connecting member is a permanent magnet or an electromagnet, and the other is a magnetic material, a permanent magnet or an electromagnet.

* * * * *